(12) United States Patent
McCaw et al.

(10) Patent No.: US 6,601,076 B1
(45) Date of Patent: Jul. 29, 2003

(54) METHOD AND APPARATUS FOR COORDINATED N-WAY SYNCHRONIZATION BETWEEN MULTIPLE DATABASE COPIES

(75) Inventors: Kelly McCaw, San Jose, CA (US);
Ravi Duggaraju, Cupertino, CA (US);
Cole Goeppinger, San Francisco, CA (US); Brad Jarvinen, San Jose, CA (US)

(73) Assignee: Palm Source, Inc., Santa Clara, CA (US)

( * ) Notice: Subject to any disclaimer, the term of this patent is extended or adjusted under 35 U.S.C. 154(b) by 250 days.

(21) Appl. No.: 09/774,163

(22) Filed: Jan. 25, 2001

Related U.S. Application Data

(63) Continuation-in-part of application No. 09/764,524, filed on Jan. 17, 2001.

(51) Int. Cl.$^7$ .......................... G06F 12/00; G06F 17/30
(52) U.S. Cl. ........................ 707/203; 707/201
(58) Field of Search ........................ 707/200, 203, 707/201; 375/356, 357

(56) References Cited

U.S. PATENT DOCUMENTS

| | | | | |
|---|---|---|---|---|
| 5,696,799 A | * | 12/1997 | Kainulainen | 375/356 |
| 5,878,095 A | * | 3/1999 | Kainulainen | 375/357 |
| 6,141,664 A | * | 10/2000 | Boothby | 707/201 |
| 6,487,560 B1 | * | 11/2002 | LaRue et al. | 707/203 |

OTHER PUBLICATIONS

Baruch Awerbuch, Shay Kutten, Yishay Mansour, Boaz Patt-Shamir, and George Varghese (1993), Time Optimal Self-Stabilizing Synchronization, pp. 652–661.*

Gruia-Catalin Roman and Mark S. Day (1984), Multifaceted distributed systems specification using processes and event synchronization, pp. 44–55.*

Hisaaki, Katagiri, Keiichi Yasumoto, Akira Kitajima, Teruo Higashino, and Kenichi Taniguchi (2000), Hardware Implementation of Communication Protocols modeled by Concurrent EFSMs with Multi-way Synchronization, pp. 762–767.*

Anoop Gupta (1989), High-Speed Implementations of Rule-Based Systems, pp. 119–146.*

(List continued on next page.)

Primary Examiner—Safet Metjahic
Assistant Examiner—Merilyn Nguyen
(74) Attorney, Agent, or Firm—Wagner, Murabito & Hao LLP

(57) ABSTRACT

A method and system for synchronizing multiple copies of a database in a network environment wherein each copy can have a customized synchronization rule-set. Specifically, the present invention discloses a method and system for a coordinated "n-way" synchronization of multiple database copies where "n", the number of copies synchronized, is essentially any number more than two. Further, each database copy is assigned to a priority level that defines the order of synchronization priority. At each priority level, starting with the level with highest priority, the present invention dynamically creates a non-conflicting rule-set upon synchronization of the n-database copies. Thereafter, rule-based synchronization of the n-database copies is performed according to priority order. This process is repeated at each priority level where higher order priority levels have priority over lower order levels in terms of synchronization of the database copies between priority levels.

25 Claims, 13 Drawing Sheets

OTHER PUBLICATIONS

T. V. Lakshman and Dipak Ghosal (1991), Performance Evaluation of an Efficient Multiple Copy Update Algorithm, pp. 488–495.*

Louise Lamont, Lian Li, Renaud Brimont, and Nicolas D. Georganas(1996), Synchronization of Multimedia Data for a Multimedia News–on–Demand Application, pp. 264–278.*

Ragunathan Rajkumar (1990), Real–Time Synchronization Protocols for Shared Memory Multiprocessors, pp. 116–123.*

Herng–Yow Chen and Ja–Ling Wu (1996), MultiSync: A Synchronization Model for Multimedia Systems, pp. 238–248.*

* cited by examiner

RULES TABLE

| | ACTION RECOGNIZED AT SYNCHRONIZATION | $DB_1$ "HERE" | $DB_2$ | $DB$-- "OUT THERE" | $DB_n$ | RULE |
|---|---|---|---|---|---|---|
| 1110a | DELETION OF RECORD $R_1$ IN LOCAL DATA BASE | $D_1$ | - | - | - | DELETE RECORD $R_1$ FROM ALL DATA BASES |
| 1110b | DELETION OF RECORD $R_1$ IN ANOTHER DATA BASE | - | $D_1$ | - | - | DELETE RECORD $R_1$ FROM ALL DATA BASES |
| 1110c | DELETION OF AND MODIFICATION TO SAME RECORD IN TWO DIFFERENT DATA BASES | $D_1$ | $M_1$ | - | - | WRITE MODIFIED RECORD $R_1$ TO ALL DATA BASES |
| 1110d | DELETION OF SAME RECORD IN MULTIPLE DATA BASES | $D_1$ | $D_1$ | - | - | DELETE RECORD $R_1$ FROM ALL DATA BASES |
| 1110e | MODIFICATION OF RECORD $R_1$ IN ONE DATA BASE | $M_1$ | - | - | - | WRITE MODIFIED RECORD $R_1$ TO ALL DATA BASES |
| 1110f | TWO DIFFERENT MODIFICATIONS TO TWO DIFFERENT RECORDS | $M_1$ | $M_2$ | - | - | WRITE BOTH MODIFIED RECORDS $R_1$ & $R_2$ TO ALL DATA BASES |
| 1110g | ADD A RECORD IN ONE DATA BASE (TREAT LIKE A MODIFICATION) | $A_1$ | | - | - | ADD RECORD TO ALL DATA BASES WITH SAME RECORD ID THROUGHOUT |
| 1110h | DELETION AND MULTIPLE MODIFICATIONS TO SAME RECORD | $D_1$ | $M_1$ | - | $M_n$ | WRITE EACH MODIFIED RECORD TO ALL DATA BASES, WITH NEW RECORD IDs AS NECESSARY |
| 1110i | DIFFERENT MODIFICATIONS TO SAME RECORD IN MULTIPLE DATA BASES | $M_1$ | $M_2$ | - | $M_n$ | WRITE EACH MODIFIED RECORD TO ALL DATA BASES, ADD NEW RECORD IDs AS NECESSARY |
| 1110j | SAME MODIFICATION TO SAME RECORD IN MULTIPLE DATA BASES | $M_1$ | $M_1$ | - | - | WRITE MODIFIED RECORD TO UNMODIFIED DATA BASES |

$D_1, D_2, D_n$    DELETIONS OF RECORDS $R_1, R_2, R_3$ RESPECTIVELY.
$M_1, M_2, M_n$:    MODIFICATIONS TO RECORDS RESPECTIVELY.
$A_1$    ADD NEW RECORD
   NO CHANGE TO RECORD

FIGURE 11

METHOD AND APPARATUS FOR COORDINATED N-WAY SYNCHRONIZATION BETWEEN MULTIPLE DATABASE COPIES

CROSS REFERENCE TO RELATED APPLICATION

This patent application is a Continuation-in-Part of co-pending commonly-owned U.S. patent application, Ser. No. 09/764,524 entitled "Rule-Based, N-Way, Synchronization of Multiple Copies of a Database", by McCaw et al., filed on the 17th day of January 2001, which herein is incorporated by reference, and is pending.

BACKGROUND OF THE INVENTION

1. Field of the Invention

The present invention relates to the field of synchronizing multiple copies of one or more databases in a network environment including electronic devices.

2. Related Art

As the components required to build a computer system have reduced in size, new categories of computer systems have emerged. One of the new categories of computer systems is the "palmtop" computer system. A palmtop computer system is a computer that is small enough to be held in the hand of a user and can therefore be "palm-sized." As a result, palmtops are readily carried about in a briefcase or purse, and some palmtops are compact enough to fit into a person's pocket. By virtue of their size, palmtop computer systems are also lightweight and so are exceptionally portable and convenient.

Most palmtop computer systems are used to implement various personal information management (PIM) applications such as an address book, a daily organizer, scheduling calendar, and electronic notepads, to name a few. Palmtop computers with PIM software have been known as Personal Digital Assistants (hereinafter referred to as "PDAs").

Further development of PDAs has enabled their use for portable, and even wireless, access to computer networks. The portability and convenience, and, most importantly, the ready ability to synchronize a palmtop device with other computers and data sources, makes such devices ideal for use in networks that serve the workplace as well as the home.

Synchronization is a process that provides the ability to coordinate the databases maintained on a PDA with copies, or versions, of the same database maintained on a desktop or other computer, or other electronic device, such as a cell phone. Not only is the access to data generally more readily available on a desktop, but desktops or other networked devices have ready access to printers and communication with other devices in the network and the internet on a continuing basis.

Typically, in a network having a PDA, a 2-way synchronization is accomplished with the PDA communicating with a desktop through a cradle device. Synchronization is initiated at either the desktop or PDA and the user can generally select whether the PDA's database is to be written over (one-way), or the desktop's database is to be written over (one-way the other way), or all modifications on each are to be incorporated in the other (two-way).

Historically, however, as the number of copies of a database grows, the number of required synchronizations grows exponentially. Each additional copy of each database needs to be synchronized with all the other copies, resulting in a growth of time required on the order of $2^n$, where "n" is the number of database copies to be synchronized. This number "n" is increased for each database maintained.

In a complex network, with a dynamic set of databases, the time devoted to necessary synchronizations could begin to drag down system performance with even a modest number of databases and their respective copies. More importantly, if synchronization takes too long, users will begin to initiate synchronization less frequently than necessary, or worse, avoid it entirely.

What is required, therefore, is a mechanism for rapidly and reliably synchronizing multiple copies of one or more databases in a network environment. The need further exists to allow the expansion of the number of copies of a database that are synchronized without unnecessary limit and without an exponential increase in the amount of time required to accomplish the synchronization process.

SUMMARY OF THE INVENTION

The present invention discloses a method and system for rapidly and reliably synchronizing multiple copies of one or more databases in a network environment. The present invention also discloses a method and system for increasing the number of database copies without a corresponding exponential increase in the amount of time required to accomplish the synchronization process.

Specifically, the present invention discloses a method and system for a coordinated "n-way" synchronization of multiple database copies where "n", the number of copies synchronized, is essentially any number more than two. In one embodiment of the present invention, each database copy has its own customized set of synchronization rules. Further, each database copy is assigned to a priority level that defines the order of synchronization priority.

Upon synchronization of the n-database copies, one embodiment of the present invention dynamically creates a non-conflicting rule set at each synchronization priority level. Thereafter, rule-based synchronization of the n-database copies is performed by identifying a focus copy of the database located at the present priority level and comparing the data records of the focus copy against the same records in other copies of the database. The proper action such as deletion, modification, addition, retention, and addition of new record identifiers at the appropriate database copy is then performed for synchronization. The record modifications described above are done accordingly to rules as defined in the non-conflicting rule-set for the given priority level.

The process then identifies another focus copy of the database located at the present priority level, or if none are found at the present priority level, then at the next highest priority level until all copies of the database have been synchronized.

This focus selection process is repeated at each priority level for each copy of the database classified with that priority level, starting at the level with the highest priority and proceeding to the next highest priority level, until synchronization of all copies of the database is complete. In terms of synchronizing database copies between participation levels, higher order participation levels have priority over lower order levels. The method and system enabled by the present invention allows the speedy maintenance of multiple, synchronized databases without the inadvertent loss of any data record.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

FIG. 11 is a Table of Rules illustrating a non-conflicting rule-set for a given synchronization priority level in accordance with one embodiment of the present invention.

DETAILED DESCRIPTION OF THE INVENTION

Figure 1:
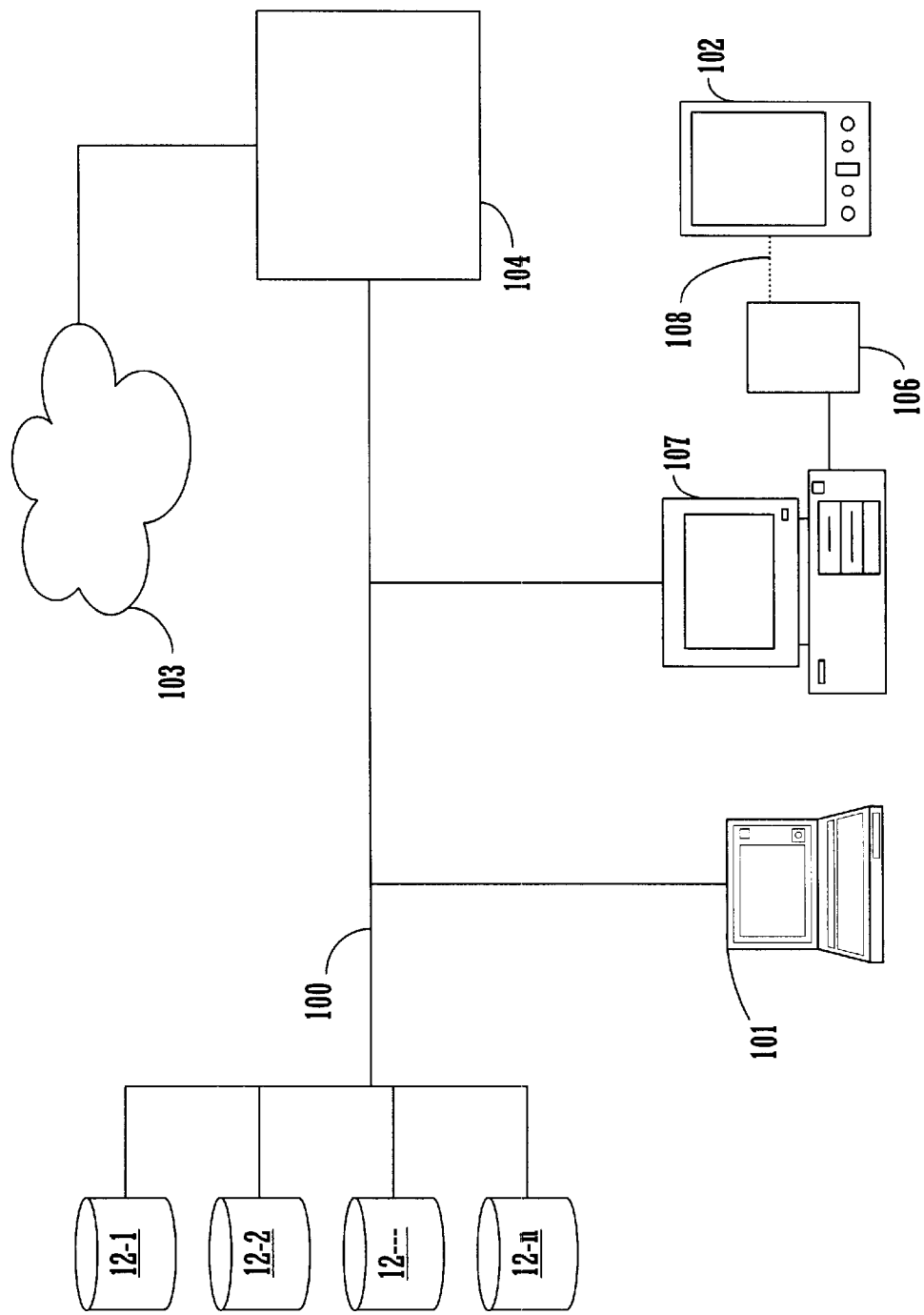
FIG. 1 illustrates a typical network synchronization environment, with multiple databases, in accordance with one embodiment of the present invention.

Reference will now be made in detail to the preferred embodiments of the present invention, a coordinated n-way synchronization between multiple database copies, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "accessing" "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Exemplary Palmtop Computer System Platform

The present invention is compatible with any electronic device having a dataset of information, e.g., a database. Some embodiments of the present invention discussed herein relate to a method of accomplishing, and a system for enabling, the synchronization of multiple copies of one or more databases resident on different electronic devices in a network environment. One of the common types of electronic systems which can be used in accordance with one embodiment of the present invention is referred to as a personal digital assistant, or commonly called a PDA.

One embodiment of the present invention refers to a PDA (or palmtop device) that is hardwired-cradle connected or wirelessly connected to a network. The palmtop device or PDA can be synchronized to any number of database copies that are coupled to the same network. Further, multiple databases can be synchronized with their respective database copies that are coupled to the network. The network can be a local area network (LAN) or a wide area network (WAN)

or merely a cradle connected to a stand-alone desktop. Other embodiments of the present invention may be implemented as synchronizations between laptops, between desktops, cell phones, server computers, or any combination of each.

In this discussion of some embodiments of the present invention, the terms "palmtop", "palm device", "PDA", "handheld device", and "handheld computer" are used more or less interchangeably. In each case, they refer to a class of small, user-portable, computing devices that are capable of coupling with a host device, such as a desktop or laptop computer, and with which the devices can participate in a synchronization between databases. The term "synchronization" refers to the act of making all synchronized versions or copy of a database agree in content.

The operation of this embodiment of the present invention and the environment in which it operates may be understood by reference to the figures. FIG. 1 presents, in logical form, a typical network in accordance with one embodiment of the present invention. Both desktop computer 107 and laptop 101 are connected to network 100 which is also served by server 104. Server 104 also, in this implementation, provides connectivity to internet 103. Connected to desktop 107 is palmtop device cradle 106 which provides a means 108 of connecting palmtop device 102 to the desktop 107. By supplying this connection, desktop 107 takes on the role of host device to palmtop device 102.

Also connected to network 100 are database copies 12-1 through 12-n. These database copies 12-1 through 12-n can be located in the aforementioned devices 107, 101, 104, 106, and other electronic devices coupled to network 100. The numbering of these database copies 12-1 through 12-n is meant to signify that there is no actual limit to the number of database copies served and synchronized in this embodiment of the present invention. Although the connectivity of palmtop device 102 is shown in this embodiment to be by hardwired cradle (see FIG. 4), other embodiments may employ infrared, RF or any other means of connectivity between the host device and the portable device. By whatever means connected, the object of synchronization is to conform all copies of any given database, for example database copies 12-1 through 12-n of FIG. 1, to the same content.

Figure 2:
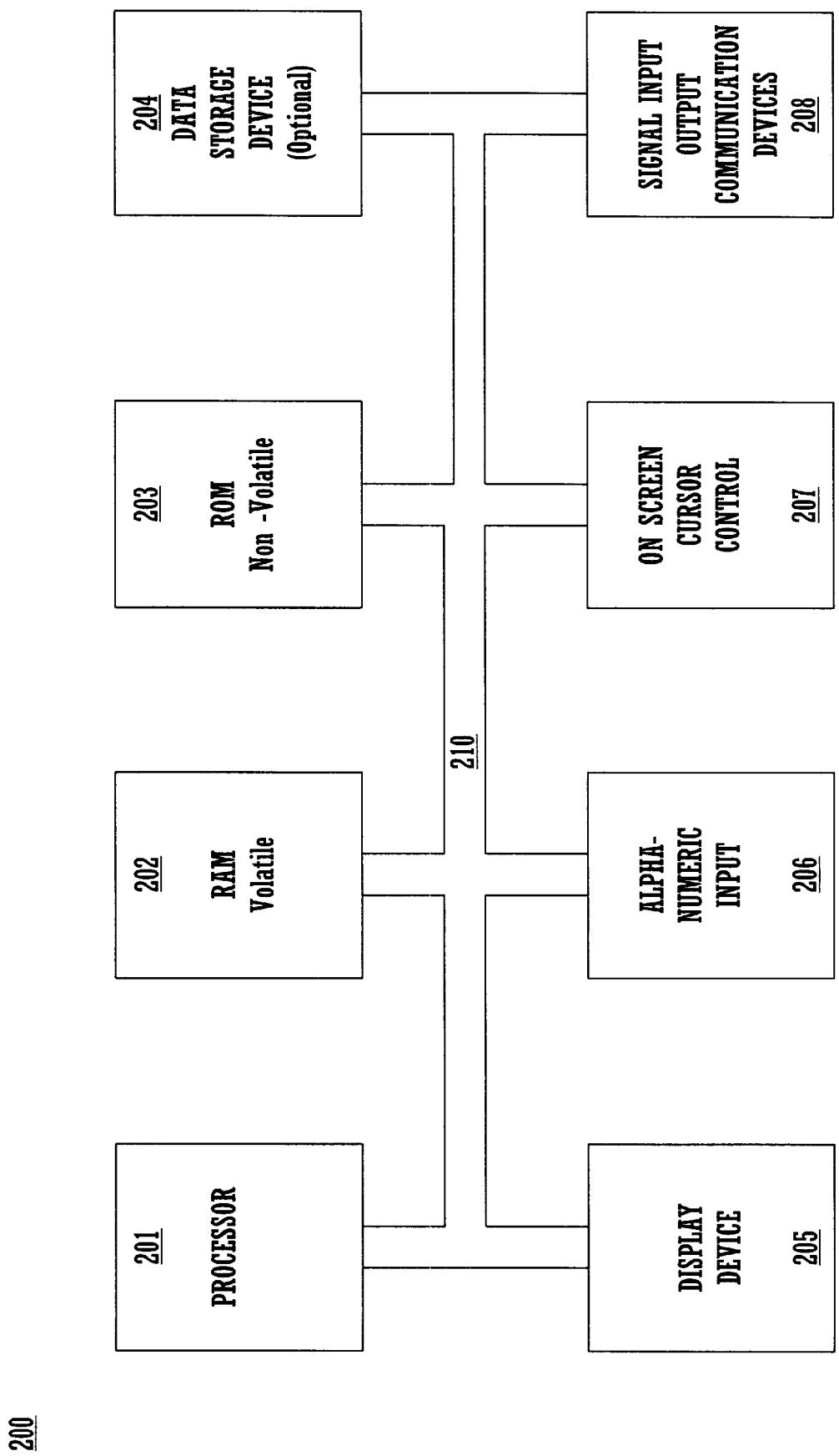
FIG. 2 is a logical block diagram of a portable computer system in accordance with an embodiment of the present invention.
Figure 3:
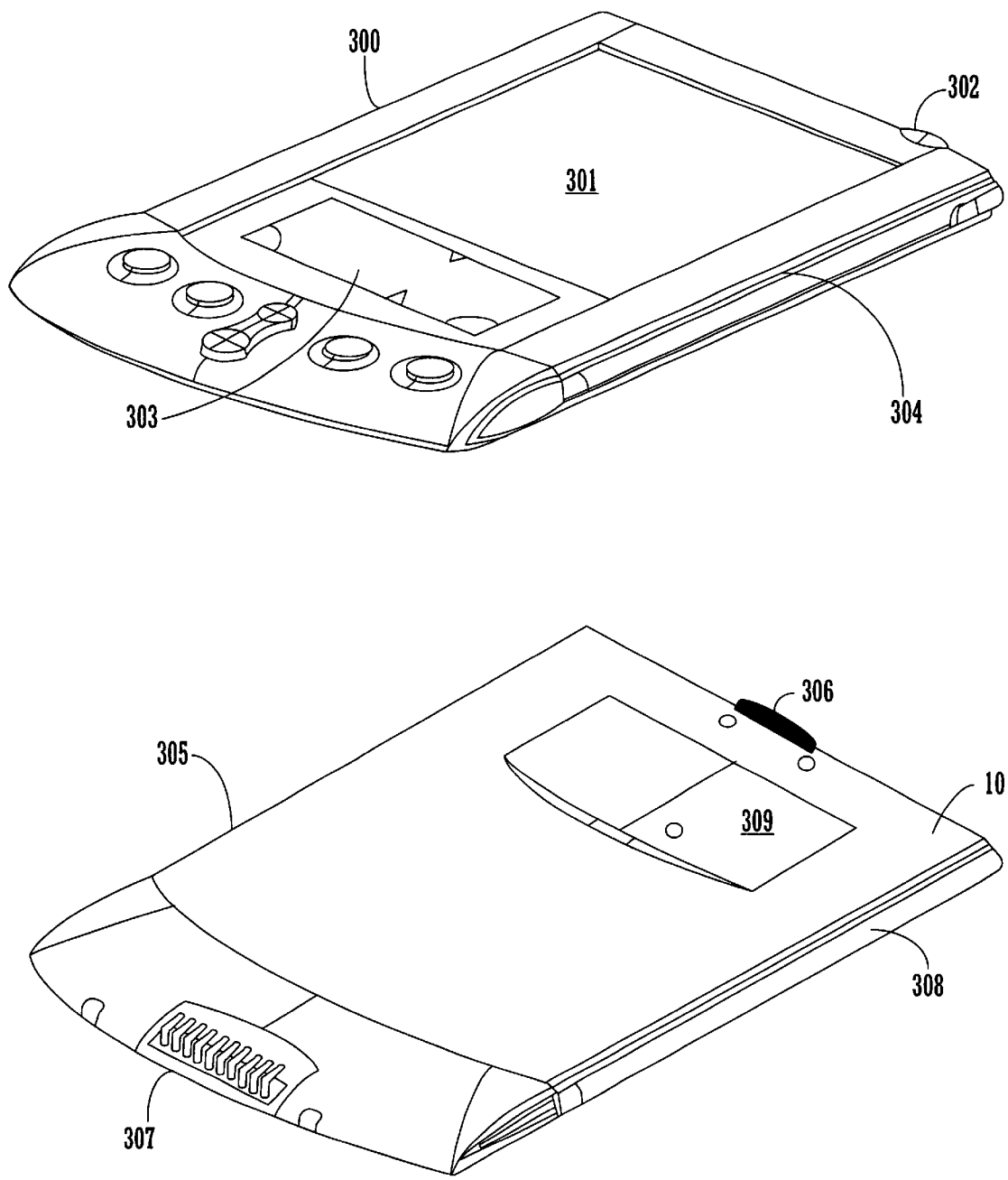
FIG. 3 illustrates a physical embodiment of a portable computing system in accordance with one embodiment of the present invention.
Figure 5:
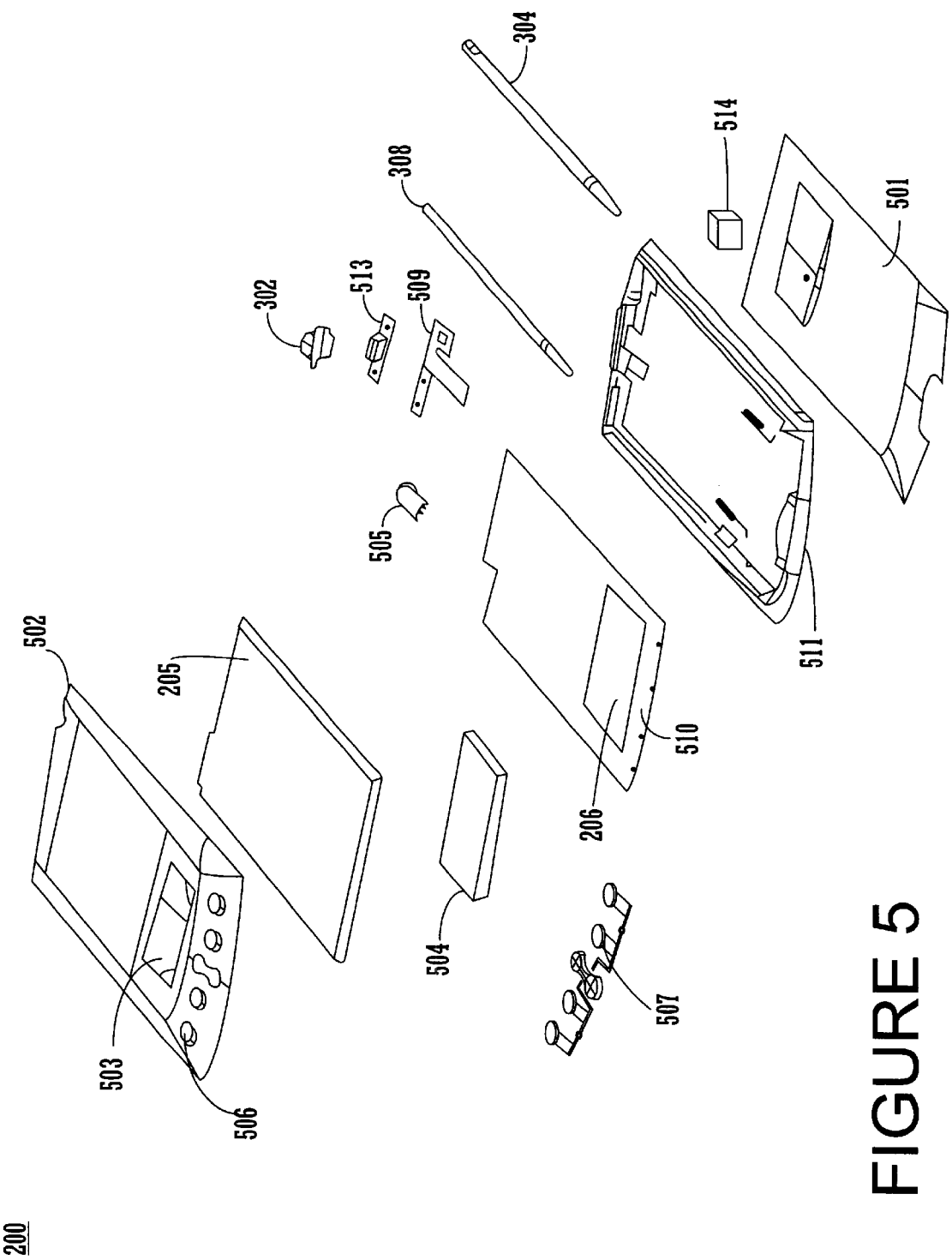
FIG. 5 is an exploded view of the components of the portable computing system of FIG. 3 in accordance with one embodiment of the present invention.

A typical palmtop device is illustrated in FIGS. 2, 3 and 5. FIG. 2 illustrates, in block diagram, a configuration typical to a palmtop device or PDA consistent with this embodiment of the present invention. Portions of a computer system implementing embodiments of the present invention are comprised of computer-readable and computer-executable instructions which reside, for example, in computer-readable media of an electronic system (e.g., personal digital assistant, computer system, and the like). It is appreciated that the exemplary PDA 200 of FIG. 2 is only exemplary and that the present invention can operate within a number of different electronic systems including general purpose networked computer systems, embedded computer systems, server computers, and stand alone electronic systems such as a cellular telephone or a pager.

Computer system 200 of FIG. 2 comprises bus 210 which connects processor 201, volatile RAM 202, non-volatile ROM 203 and data storage device 204. Also connected to the bus are display device 205, alpha-numeric input device 206, cursor control 207, and signal Input/Output (I/O) device 208. Signal I/O device 208 can be implemented as a serial connection, an infrared transceiver, or an RF transceiver. Any one of the aforementioned I/O devices 208, in some embodiments of the present invention, can be used as the link for synchronization.

FIG. 3, a top and bottom view of a typical PDA, illustrates the physical implementation of some of the logical devices above. Panel 301, in top view 300, integrates the display device and, when touched with stylus 304, cursor control. Alpha-numeric input is via input panel 303. Power to the device is applied when on/off button 302 is depressed. Connection to a network can be implemented either through an RF connection using extendible antenna 308, or by infrared (IR) connection. IR connection is provided by IR window 306 which is shown on bottom view 305. Connector array 307 provides the capability for wired connectivity to a desktop computer and thence a network by the use of a cradle (See FIG. 4).

Although implemented in this embodiment as a serial port, wired connectivity via connector 307 could also alternatively be any of a number of well known communication standards and protocols, e.g., parallel, SCSI (small computer system interface), Firewire (IEEE 1394), Ethernet, etc.

Further illustration of these devices is given in FIG. 5. FIG. 5 is an exploded view of palmtop computer system 200 in accordance with one implementation. Computer system 200 contains a back cover 501 and a front cover 502 having an outline of region 503 and holes 506 for receiving buttons 507. A flat panel display 205 (both liquid crystal display and touch screen) fits into front cover 502. Any of a number of display technologies can be used, e.g., liquid crystal display (LCD), field emission display (FED), plasma, etc., for the flat panel display 205. A battery 504 provides electrical power. A contrast adjustment 505, a potentiometer in this embodiment, is also shown, as well as an on/off button 302. A flex circuit 509 is shown along with a printed circuit (PC) board 510 containing electronics and logic (e.g., memory, communication bus, processor, etc.) for implementing computer system functionality. The digitizer pad 206, implementing one means of alpha-numeric input, is also included in PC board 510. A midframe 511 is shown along with stylus 304. Position-adjustable antenna 308 is also shown.

Infrared communication mechanism 513 (e.g., an infrared emitter and detector device) is for sending and receiving information from other similarly equipped devices or, in this embodiment, communicating with a host device in a network (see FIG. 1). An embodiment implementing communication with a network through the infrared device does not preclude additional implementation of communication through other means such as an RF link.

To illustrate the implementation of an RF link in an embodiment of the present invention, a signal (e.g., radio) receiver/transmitter device 514 is also shown in FIG. 5. The receiver/transmitter device 514 is coupled to the antenna 308 and also coupled to communicate with the PC board 510. In one implementation the Mobitex wireless communication system is used to provide two-way communication between computer system 100 and other networked computers and/or the Internet via a proxy server (104 in FIG. 1).

FIG. 5 illustrates the implementation of several features illustrated in FIG. 2. Some circuitry of computer system 200 can be implemented directly on PC board 510 (FIG. 5). PC board 510 can contain processor 201, bus 210, ROM 203 and RAM 202.

With reference still to FIGS. 2 and 5, computer system 200, such as a PDA, also includes a signal transmitter/receiver device 514, which is coupled to bus 210 for providing a physical communication link between computer system 200, and a network environment (e.g., network environment 100 of FIG. 1). As such, signal transmitter/receiver device 514 enables central processor unit 201 to communicate wirelessly with other electronic systems coupled to the network. It should be appreciated that within the present embodiment, signal transmitter/receiver device 514 is coupled to antenna 308 (FIGS. 3 and 5) and provides the functionality to transmit and receive information over a wireless communication interface. It should be further appreciated that the present embodiment of signal transmitter/receiver device 514 is well suited to be implemented in a wide variety of ways. For example, signal transmitter/receiver device 514 could also be implemented as a modem.

Figure 4:
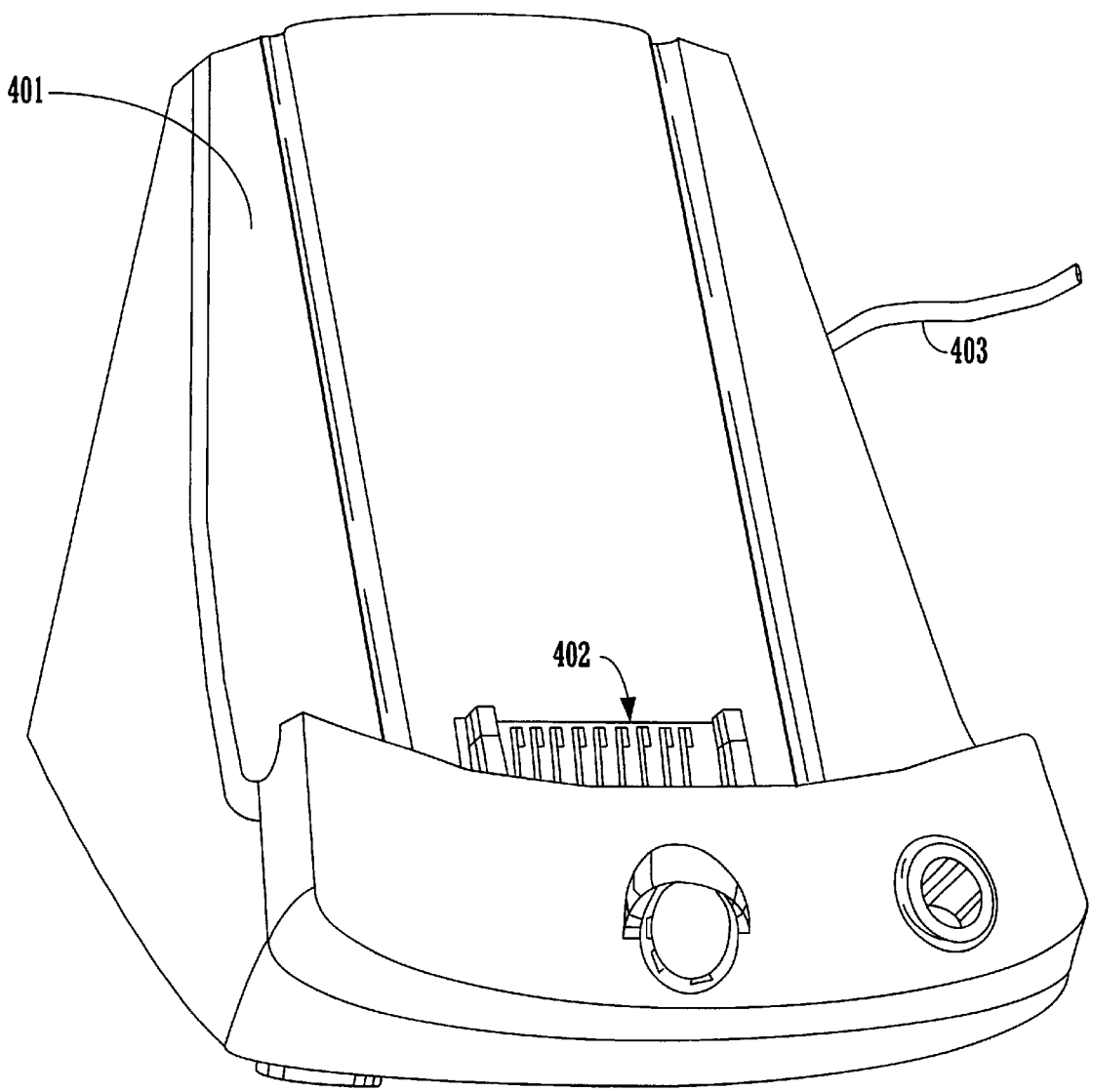
FIG. 4 is a perspective view of a cradle device for an alternative connection of a typical portable computing system to other systems via a communication interface in accordance with one embodiment of the present invention.

The typical connection between a PDA and its associated host device is by a cradle connected to a serial port on the host device. FIG. 4 is an illustration of a typical cradle. To connect, the PDA is set in cradle 401 where connector array 402 contacts the counterpart connectors on the portable device. The connectors, through cable 403, enable serial communication with the host device. The host device is represented in this embodiment as desktop 107 in FIG. 1.

2-Way Synchronization

A method and system are described utilizing the technique of synchronizing two or more copies of a database. Referring again to FIG. 1, synchronization can be initiated either by PDA 102 or desktop 107 in a 2-way synchronization process. Desktop 107 is connected to network 100 which is served by server 104 and to which laptop 101 is also connected. Again, server 104 provides link to internet 103.

Figure 6:
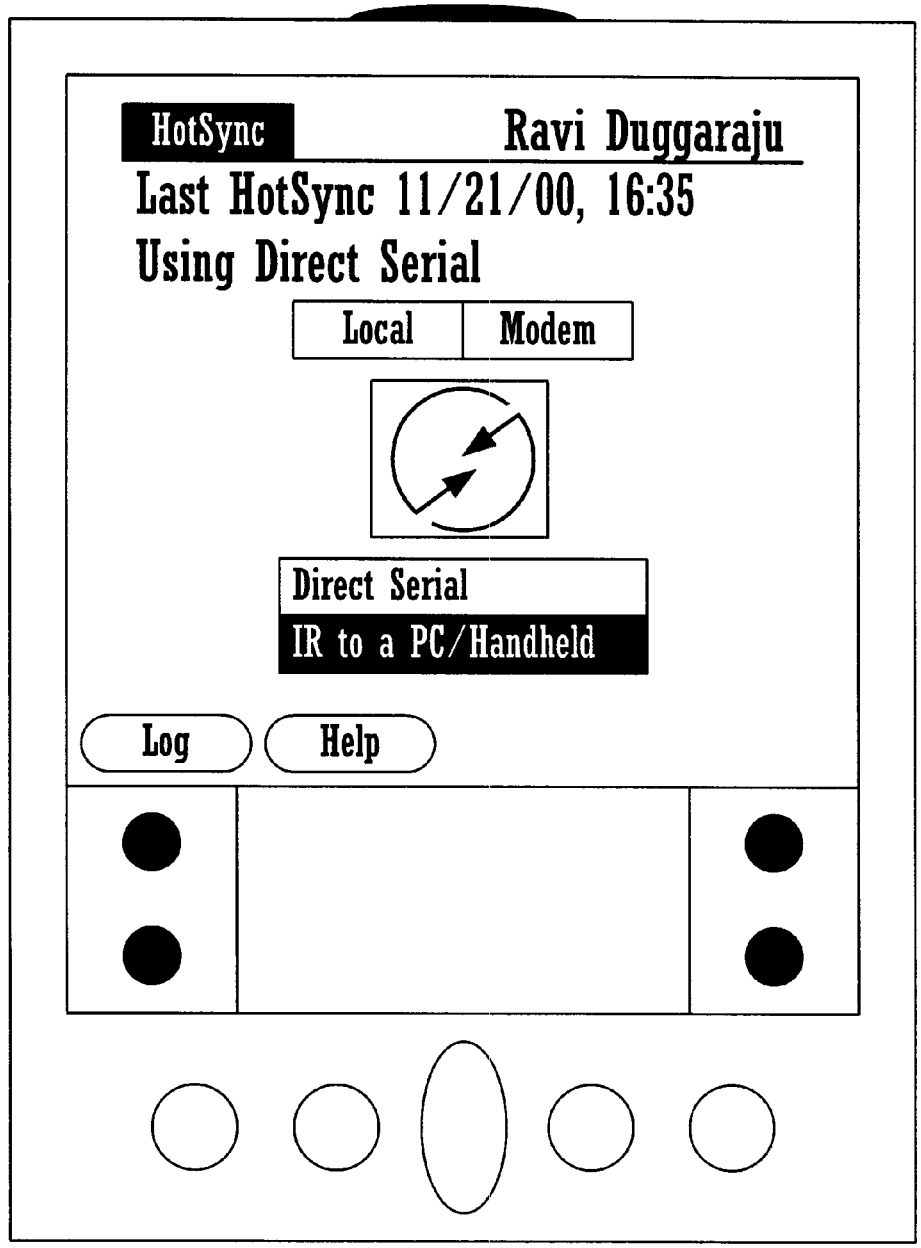
FIG. 6 illustrates a front view of a portable computing system illustrating one possible implementation of a display screen in accordance with one embodiment of the present invention.

With or without the connection to the network, a synchronization initiated by either PDA 102 or host device 107 is normally limited to the database copies on each. Since there are two versions of each synchronized database, one each resident on host device 107 and PDA 102, this is known as a "2-way" synchronization. FIG. 6 illustrates a display presented during synchronization on a typical PDA.

When the number of versions, or copies, of any database being synchronized is more than two, the technical aspects of synchronization increase significantly. The letter "n" is used mathematically to indicate an integer of undetermined size. In synchronization parlance, it is used to indicate any integer larger than two and it refers to the number of versions of a database being synchronized. Thus a more-than-two-way synchronization is known as an "n-way" synchronization. Referring again to FIG. 1, if synchronization is initiated that also synchronizes versions of databases resident on laptop 101 and/or server 104, then FIG. 1 would further illustrate a logical arrangement suitable to a three-way, or four-way, synchronization on network 100.

Two-way synchronizations are, in most embodiments, relatively uncomplicated processes, wherein data records within the database copies located at the two devices are compared and modified as necessary. At the initialization of synchronization, each data record is checked for modification, addition or deletion which is indicated by a flag associated with each record in the database copy. Flags are set only if no synchronization has taken place since the action to the record. Each data record is compared with modified records in the database version in either device being written to the other device. An added data record is also written to the other device. A record deleted from one device is deleted from the other device on verification.

Each record in each device is checked for a change since the last synchronization. The device initiating the synchronization is the resident device of the initial "focus" copy or version of the database. This two-way synchronization is illustrated by block diagram of FIG. 7.

Figure 7:
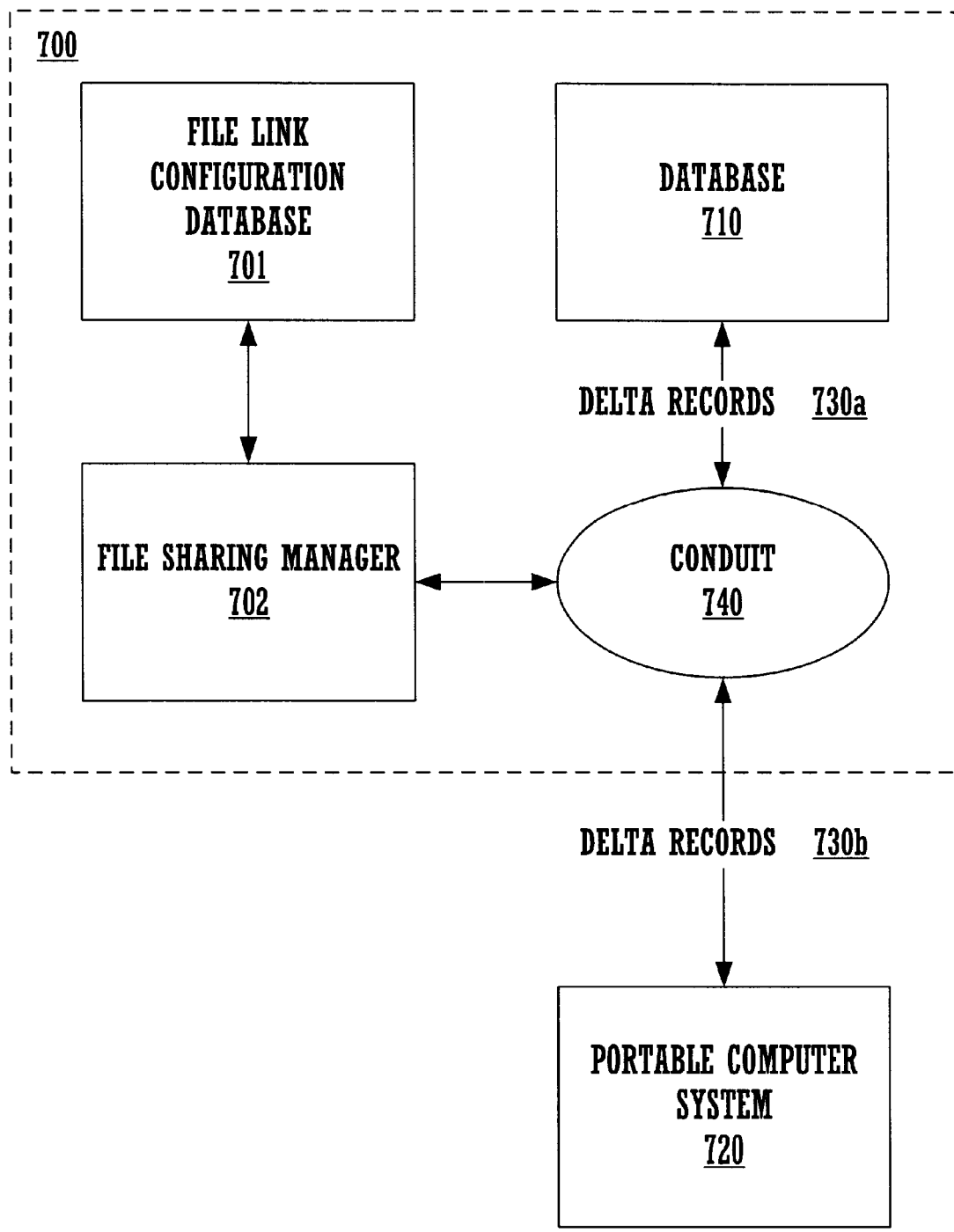
FIG. 7 illustrates, in block diagram, a basic synchronization process in accordance with one embodiment of the present invention.

FIG. 7 illustrates a synchronization system (also referred to as an "installer") in accordance with one embodiment of the present invention for allowing a portable computer system 720 (e.g., a palmtop or any portable computing system) to share information with a host computer system 700. Computer system 720 contains database 710, a software file sharing manager 702 (e.g., a hot-sync software manager), a file link configuration database 701, and a software conduit 740. The file link configuration database 701 is linked to the file sharing manager 702 and specifies, for a particular copy of a database, its source file, category information, and the frequency of update for the database copy. Conduit 740 outlines the manner in which records are to be synchronized between copies of the database under control of file sharing manager 702. This process, including the file sharing manager and the conduit, is described in U.S. Pat. No. 5,884,323 by Hawkins et al., issued Mar. 16, 1999, assigned to the assignee of the present invention and incorporated herein by reference.

Portable computer system 720 is the PDA and computer system 700 is the host device. The enabling of file sharing between the two devices is accomplished in file sharing manager 702 and conduit 740. During synchronization between portable computer system 720 and database 710, delta records 730a and 730b are passed through conduit 740 between database 326 and a database resident on portable computer system 720 under control of the file sharing manager 702. Delta records 730a and 730b represent changes (including additions) that occurred on either portable computer system 720 or on computer system 700. After synchronization, these two databases will contain the same information. Namely, records updated on portable computer system 720 are reflected in database 710 and vice versa. The synchronization process (including the file sharing manager) is described in U.S. Pat. No. 6,006,274 by Hawkins et al., issued Dec. 21, 1999, assigned to the assignee of the present invention and incorporated herein by reference. Synchronization is also described in U.S. Pat. No. 5,727,202 by Kucala, issued Mar. 10, 1998, assigned to the assignee of the present invention and incorporated herein by reference, and also in U.S. Pat. No. 5,832,489 by Kucala, issued Nov. 3, 1998, assigned to the assignee of the present invention and incorporated herein by reference.

Coordinated N-Way Synchronization

Although the description of the present invention will focus on an exemplary personal digital assistant (hereinafter referred to as "PDA") or palmtop computer system, the present invention can be practiced with other electronic systems or electronic devices (e.g. personal computer systems, cellular phones, pagers, portable web devices, server computers, etc.).

As the number of copies of a database increases, the number of operations involved in a synchronization process increases exponentially. Approximately $2^n$ synchronization operations, as described previously, are required for "n" database copies. The n-database copies can be located at the host desktop 107, laptop computer 101, PDA 102, and server computer 104 on network 100 of FIG. 1. Additionally, other devices that are capable of coupling to communication network 100 and synchronizing with other database copies throughout the network 100 can contain database copies 12-1 through 12-n. In order to minimize the $2^n$ exponential growth that would accompany a synchronization process on a large network, embodiments of the present invention implements a coordinated n-way synchronization process.

The coordinated n-way sync solution is an elegant and simple solution to the synchronization problem especially when diverse copies of a database need to be synchronized. In one embodiment of the present invention, for synchronization purposes, each copy of a database has a predefined synchronization priority level. Further embodiments of the present invention allow for each database copy to be associated with an individual rule-set. This is easily the case since there are a vast array of electronic devices that each employ a different rule-set for its databases.

Figure 8:
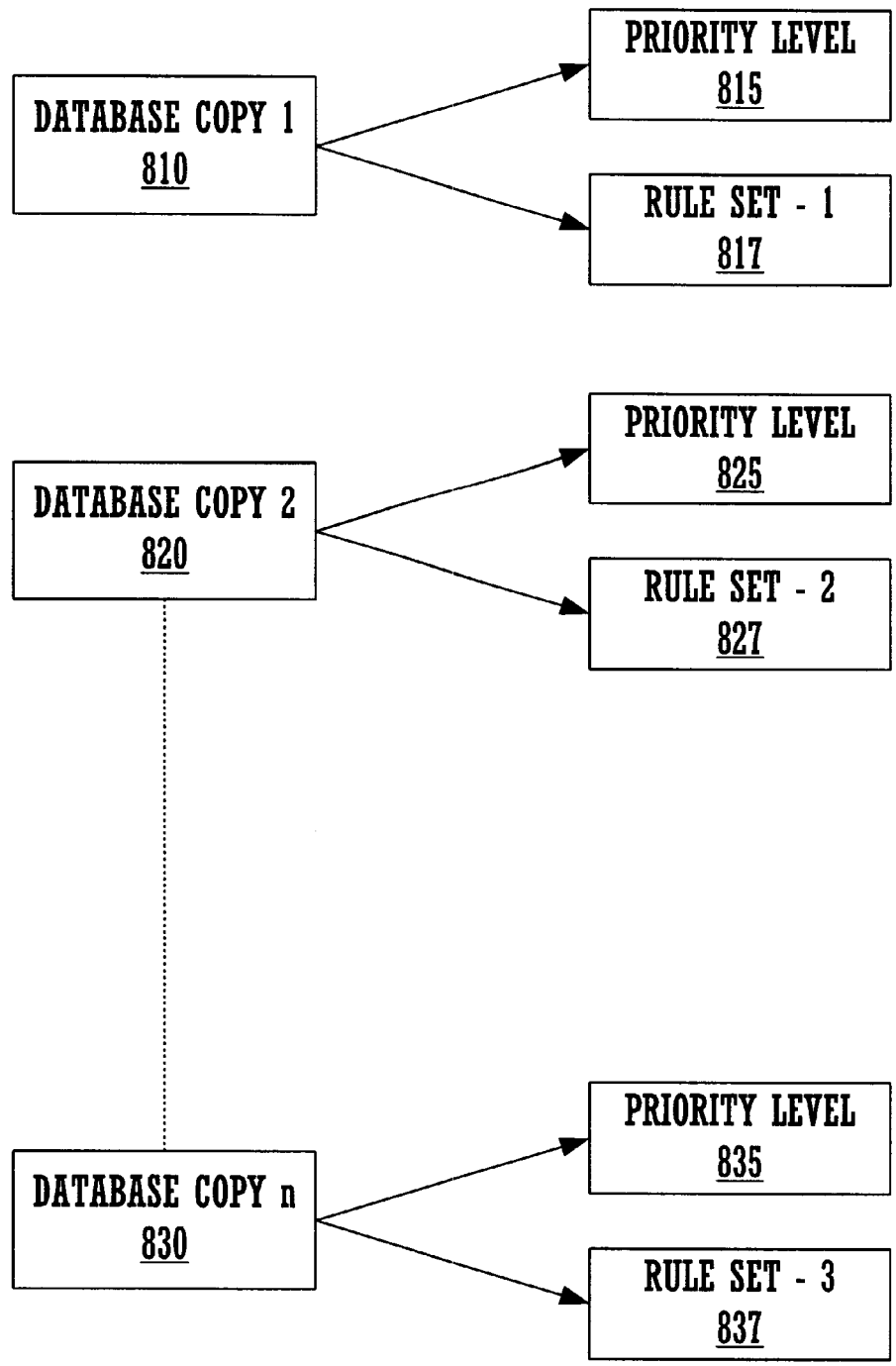
FIG. 8 illustrates individual characteristics of each database copy in accordance with one embodiment of the present invention.

FIG. 8 illustrates individual characteristics of each database copy in accordance with one embodiment of the present invention. Copy-1 810 of a database is associated with a predefined priority level 815 and has its own rule-set-1 817. Database copy-2 820 is associated with a predefined priority level 825 that can be of higher, lower, or the same synchronization priority as for database copy-1 810. Each database copy has its own individual characteristics as represented by the database copy-n 830 with a rule-set-3 837. Again, the predefined priority level 835 for database copy-n 830 can be of higher, lower, or the same synchronization priority as for database copy-1 810, and similarly for database copy-2 820.

The synchronization priority level determines a database copy's synchronization priority level. The priority level for a database copy is usually predefined and can be assigned to or classified with the corresponding priority level upon registering the electronic device that contains the database copy with the network for purposes of synchronization. Note, in some circles, the priority level is also known as a participation level. Further, the rule-set defines a set of rules/preferences for synchronization normally used by that particular copy of the database when synchronizing with other copies of that database.

The coordinated n-way synchronization process begins in a coordinated process space and is normally initiated by the PDA. In one embodiment of the present invention, upon initiating synchronization, the coordinated n-way synchronization process collects the rule-sets from all the participating copies of the database. It reads the priority levels of each copy of the database and the corresponding rule-set associated with that copy. At each synchronization priority level, a non-conflicting rule-set is formed to resolve any potential conflicts during the synchronization process.

Figure 9:
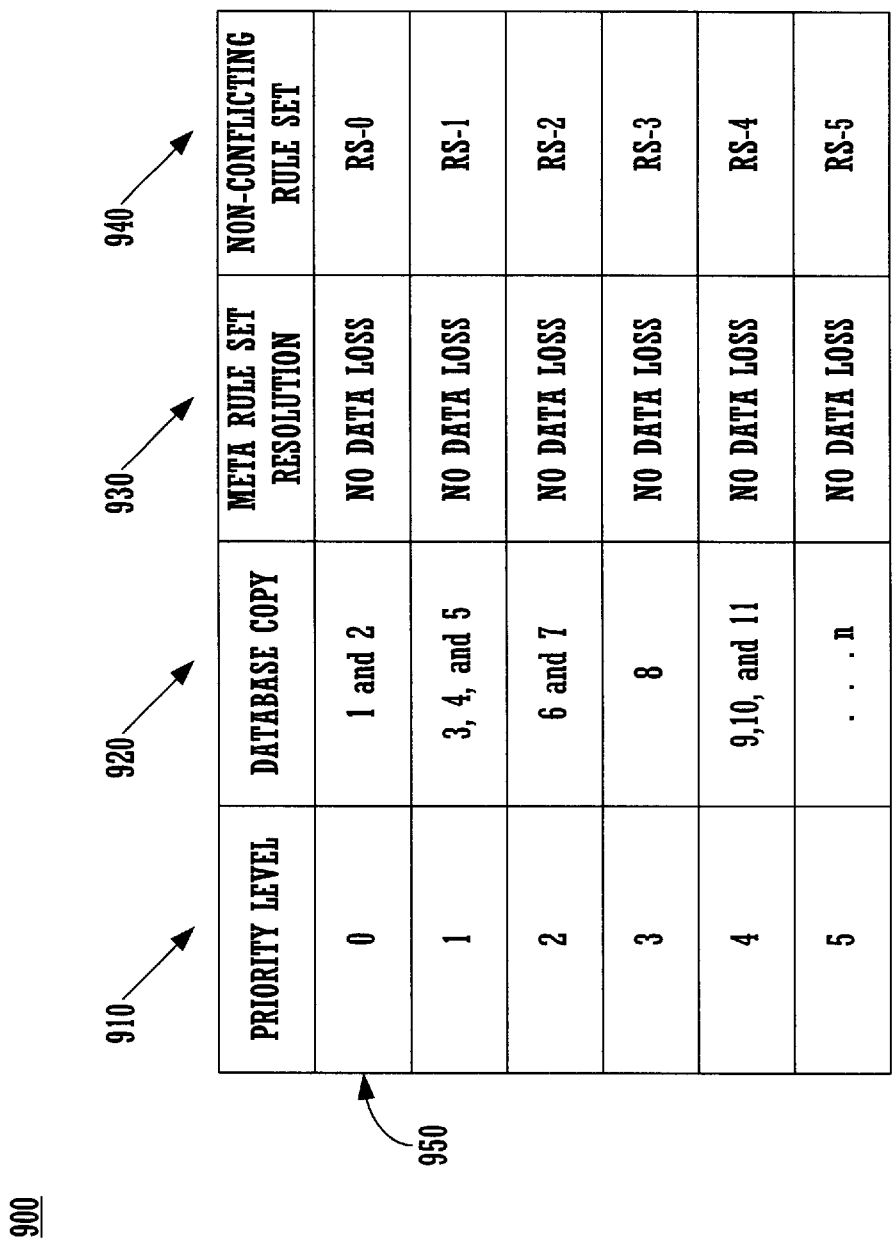
FIG. 9 illustrates a Table of Synchronization Priority Level characteristics in accordance with one embodiment of the present invention.

FIG. 9 illustrates an exemplary Priority Synchronization Table 900 in accordance with one embodiment of the present invention. Table 900 can be memory resilient. In column 910 of Table 900, the priority levels are listed starting with the highest synchronization priority level-0. The next highest synchronization priority level is priority level-1, with priority level-2 next highest and so on. Priority level-5 has the lowest synchronization priority. Only 5 priority levels are illustrated for purposes of discussion; however, it is understood that more or less priority levels could be implemented depending on the structure of the network.

The synchronization priority levels allow for prioritizing database copies in a network. For example, in a corporate environment, the central business directory would have the highest priority, while an employee's personal phone directory may have the lowest priority. In this case, the lowest level personal phone directory will not have the ability to override synchronization orders by the central business directory.

Column 920 shows the copies of the database classified at a particular synchronization priority level as shown in the column 910. Row 950 shows that database copy-1 and database copy-2 have been predefined at priority level-0.

As previously mentioned, in accordance with one embodiment of the present invention, at each synchronization priority level, a non-conflicting rule-set is formed to resolve any potential conflicts during the synchronization process. The non-conflicting rule-sets for each synchronization priority level are shown in column 940. In row 950, for priority level-0, the non-conflicting rule-set is labeled RS-0.

The non-conflicting rule-sets in column 940 define the synchronization rules implemented when synchronizing corresponding database copies. For example, for priority level-0 in row 950, the rules as defined by non-conflicting rule-set RS-0 are implemented to synchronize database copy-1 and database copy-2 with all the other copies of the database.

Further, at each priority level, the non-conflicting rule-set is created following an underlying principle as illustrated in column 930. In the present embodiment, the meta-rule-set resolution principle for each of the priority levels is "no data loss." It is appreciated that each of the priority levels can have the same or different meta-rule-set resolution principles.

Moreover, in another embodiment of the present invention, if a conflict occurs among database copies with different synchronization priorities, the database copy with a higher priority will always prevail. In other words, rules from the rule-set associated with the database copy classified at a higher synchronization priority level overrides rules from the rule-set associated with the database copy classified at the lower synchronization priority level.

Figure 10:
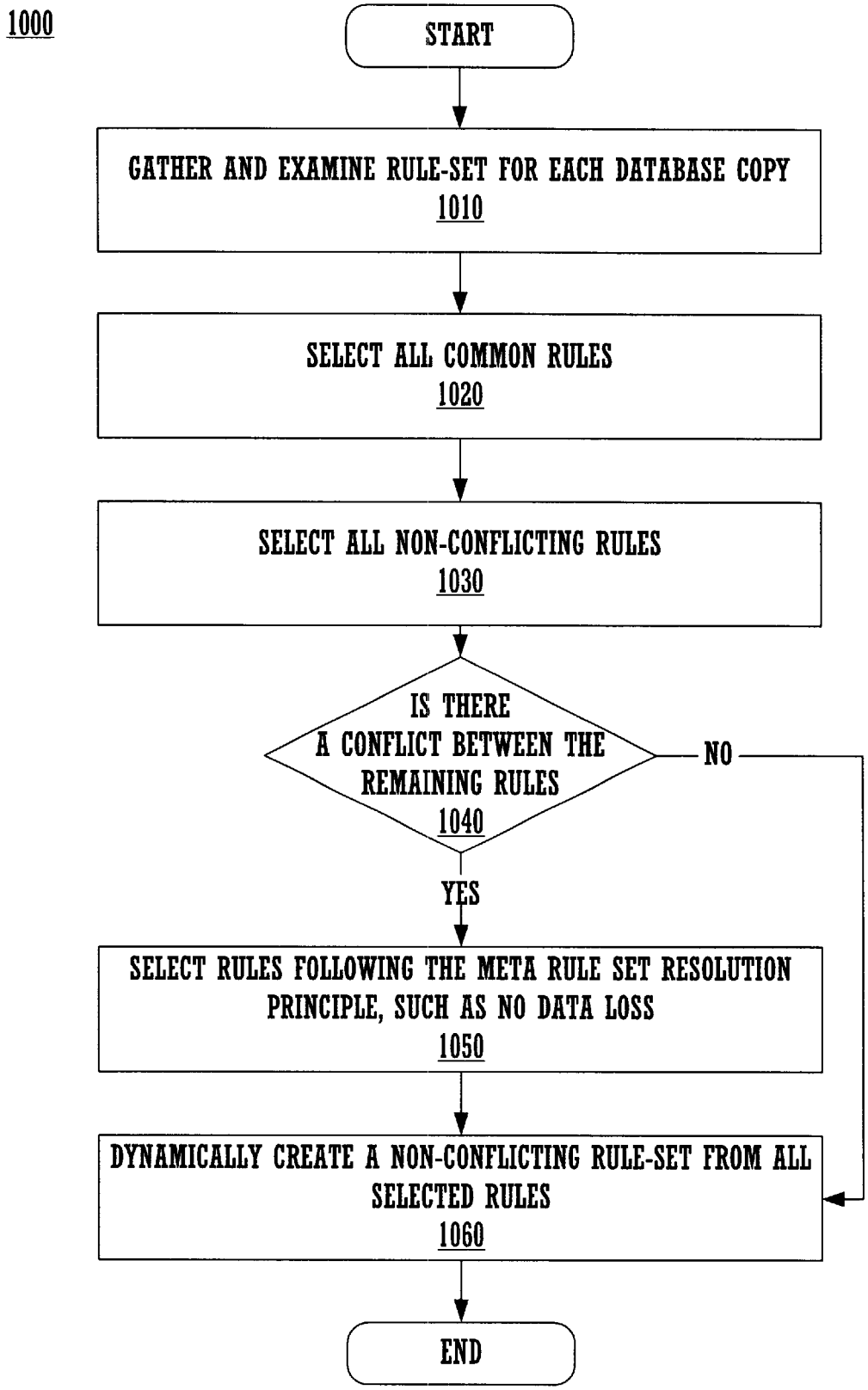
FIG. 10 is a flow diagram illustrating steps in a computer implemented method for dynamically creating a non-conflicting synchronization rule-set for a given synchronization priority level in accordance with one embodiment of the present invention.

FIG. 10 illustrates a flow chart of steps for process 1000 to dynamically create a non-conflicting rule-set for a particular synchronization priority level, in accordance with one embodiment of the present invention. Process 1000 is done separately for each priority level. In step 1010, all the rule-sets for every database copy that is classified for that particular synchronization priority level are gathered. The corresponding rules from those rule-sets are then examined in the following steps.

In step 1020 of process 1000, all the common rules are selected to be included in the non-conflicting rule-set for that particular synchronization priority level.

In step 1030 of process 1000, all the non-conflicting rules are selected to be included in the non-conflicting rule-set for that particular synchronization priority level.

In step 1040, since all the database copies have individual rule-sets, process 1000 then examines all the conflicting rules between the database copies classified for that particular synchronization priority level. If there are conflicting rules, only those rules that satisfy a meta-rule-set principle associated with that particular synchronization priority level are selected in step 1050. For example, in row 950 of Table 900, at the highest synchronization priority level, level-0, the meta-rule-set resolution principle is one where no data is lost.

The following example of a double-modification conflict illustrates application of the meta-rule-set resolution principle in creating a non-conflicting rule-set. At a given synchronization priority level, two rules associated with two different rule-sets for two different copies of a database conflict. The first database copy has rule-1 that states: propagate my changes. The second database copy has rule-2 that states: duplicate my changes. If the meta-rule-set resolution principle is one where "no data is lost", then rule-2 will be selected. Rule-1, the propagation of changes to database copy-1, will overwrite all the database copies with the changes made to database copy-1, which results in lost data in those database copies other than database copy-1. On the other hand, rule-2 duplicates the changes to database copy-2. Rule-2 makes copies of the changes to database copy-2 for entry into the other database copies, which results in no data loss.

In step 1060 of process 1000, the non-conflicting rule-set for that particular synchronization priority is dynamically formed from all the selected rules.

Moreover, inherent in step 1050 of process 1000, in another embodiment of the present invention, when creating the non-conflicting rule set for a particular synchronization priority level, if there continues to be a conflict between two rules associated with rule-sets for two different database copies that cannot satisfy the meta-rule-set resolution principle, then neither of these conflicting rules are selected. Essentially, the records affected by those rules remain unchanged.

FIG. 11 illustrates an exemplary rules table 1100 that defines a non-conflicting rule-set for a particular synchronization priority level. It is important to note the rules in Table 1100 may be different for each separate synchronization priority level.

Figure 12:
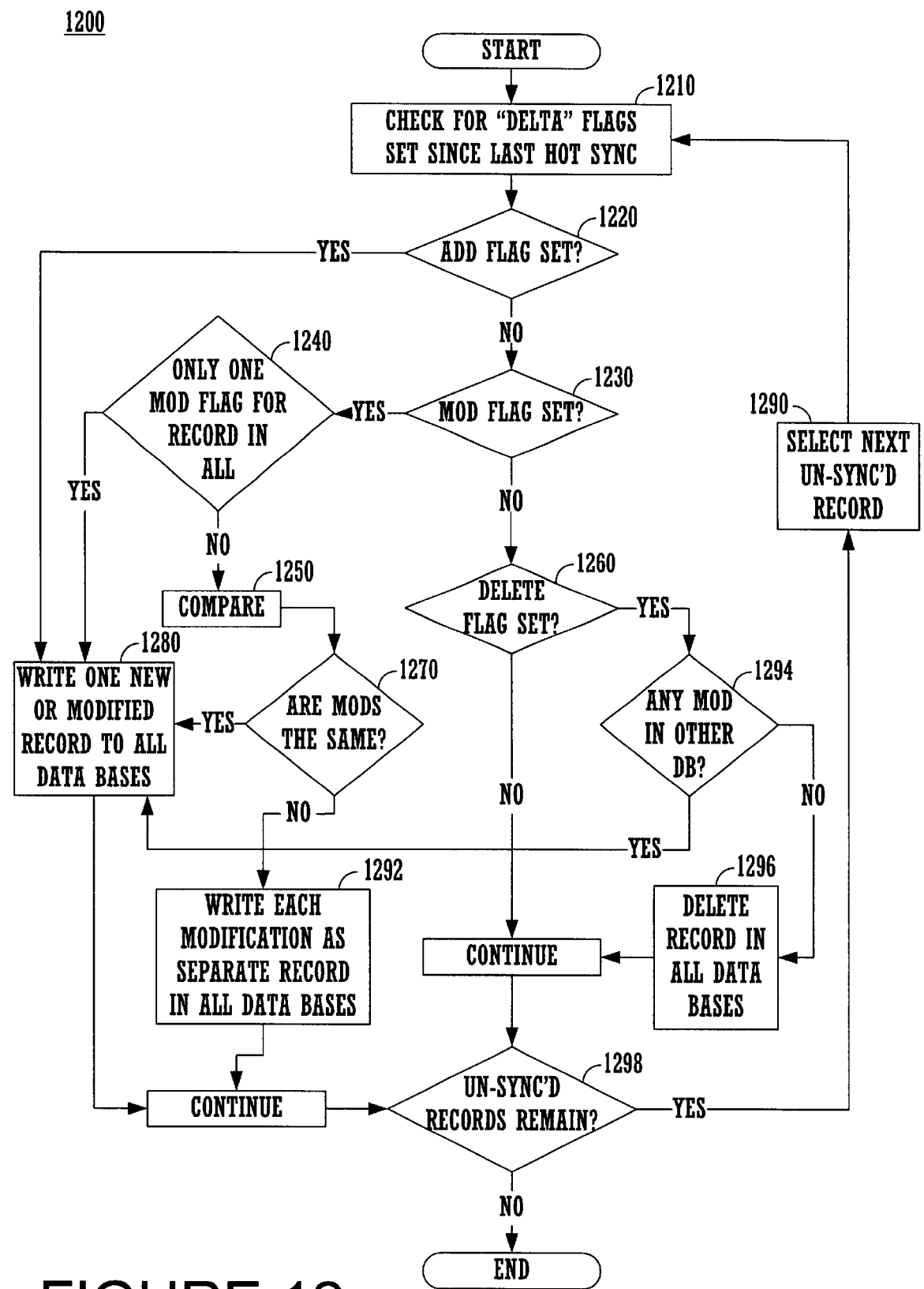
FIG. 12 is a flow diagram illustrating steps in a computer implemented method for synchronizing copies of a database for a given synchronization priority level in accordance with one embodiment of the present invention.

FIG. 11 summarizes the operations performed by the present invention during the record by record processing of the n-way synchronization process described in the flow diagram of FIG. 12, in accordance with one embodiment of the present invention. Each situation is illustrated in FIG. 11 by a separate table entry and the actions to be taken are shown on the right for each. Each record process of FIG. 11 is a data record of the focus database copy versus all other records of the same identification tag in all other database copies. The focus database copy in the example of FIG. 11 is the "DB1" column. At situation 1110a, a record of the focus database copy is deleted, but no other record corresponding to the identification of this record is either modified or deleted in any other database copy. Therefore, the action to be taken is that the record is deleted from all database copies. At situation 1110b, a record of the focus database copy is deleted from another database copy, but not from the focus database. The action to be taken is the same as for situation 1110a.

Situation 1110c is the same as situation 1110a, except that same record identification that was deleted is also modified in another database copy. In this case, the action taken is that the modified record is added to all database copies that do not already contain the modification and the deletion is ignored. Situation 1110d is an identical deletion of the same record from two or more database copies. The action to be taken is the same as for situation 1110a. In situation 1110e, a record of the focus database copy is modified. The action to be taken is that this modified record is added in each other copy not already having the modification. The situation 1110f is that a record of the focus database copy is modified by two copies. In this case, each modified record is added to each database copy (using the record's same identification tag) that does not already have the modification. In situation 1110g, a record was added to the focus database copy. This situation is treated just as a modification, e.g., the action of situation 1110e is performed.

At situation 1110h, a record of the focus database is modified, but this same record is modified in two other database copies. The action taken is the same as for situation 1110f. In situation 1110i, a record of the focus database copy is modified and this same record is also modified twice again in other database copies. The action to be taken is that each modified record is added in each other copy not already having the modification. Lastly, in situation 1110f, a record of the focus database is modified and an identical modification is made in another copy. The action taken is that a single modification is added to each other database copy that does not contain the record.

FIG. 12 illustrates a flow chart of steps for process 1200 in accordance with the synchronization of a focus database copy implementing the non-conflicting rule-set as shown in FIG. 11, in accordance with one embodiment of the present invention. Process 1200 in combination with Table 1100 is described in the co-pending, commonly owned U.S. Patent Application, entitled "Rule Based, N-Way Synchronization of Multiple Copies of a Database," which is herein incorporated by reference in its entirety. By way of demonstration, FIG. 12 shows one embodiment of the present invention whereby after a focus database is selected at a particular synchronization priority level, the data records of the focus database are scanned for "delta", or change, flags in step 1210. Subsequently, the rules of FIG. 8 are then followed.

In step 1280 of process 1200, if the delta is an addition of a new record, the new record is written to all other database copies. If a modification to an existing record in the focus database has occurred, the same record is checked in all other databases for modification in step 1240. If none has been modified, the modification is written to all other copies using that record ID.

In step 1250 of process 1200, if other modifications have occurred to the same record ID in another database, then all the modifications are compared. If the modifications are identical, then the focus database record is written to all databases in step 1280. If the modifications are not identical, then each modification is written to each copy. The focus database record modification is written to the existing record in the other databases and a new record ID is established that reflects each new modification to the same record found in the other databases in step 1292. The process then looks to the next record in the list of changes in the focus database in step 1296.

In step 1294 of process 1200, if the record modification flag is a deletion, the record ID is checked in all other databases for modification. If it has been modified in another database, the modified record is written to all database copies in step 1280, and none are deleted. If the record has not been modified in another database, it is deleted in all copies in step 1296. In step 1298, once each modified record in the focus database is accounted for, the process 1200 ends for this particular focus database copy.

Figure 13:
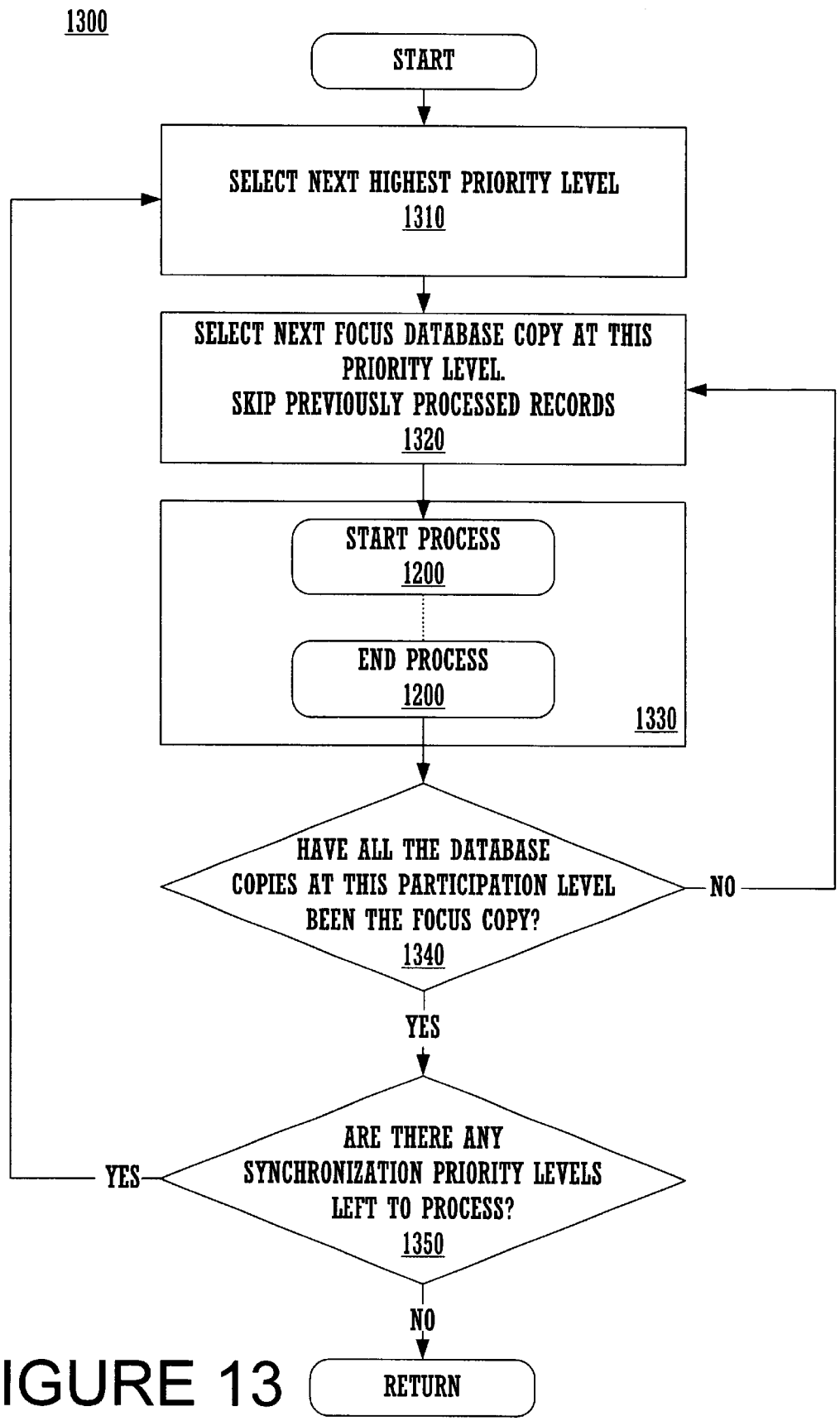
FIG. 13 is a flow diagram illustrating steps in a computer implemented method for synchronizing n-copies of a database in accordance with one embodiment of the present invention.

FIG. 13 illustrates a flow chart of steps for process 1300 in accordance with the coordinated n-way synchronization process. By way of demonstration, FIG. 13 shows one embodiment of the present invention whereby process 1300 is implemented after all the non-conflicting rules-sets for each of the particular synchronization priority levels have been created as illustrated in process 1000 of FIG. 10.

In step 1310 of synchronization process 1300, the highest synchronization priority level is selected. If the process 1300 is just beginning, by way of example, synchronization priority level-0 of FIG. 9 would be selected. A first "focus" database copy is then selected in step 1320. In one embodiment, this is usually driven by either user desire or software-assigned priority. Alternatively, in another embodiment, any database copy at that synchronization priority level may be selected.

In step 1330 of coordinated n-way synchronization process 1300, after the focus database copy is selected, the synchronization process 1200 is performed for that focus database copy. Upon completion of the synchronization of all the records in the focus database copy, process 1300 then proceeds to step 1340 to see if there are any database copies that remain at this particular priority level that have not been the focus copy. If yes, then process 1300 moves on to the next database copy that becomes a focus copy in the same synchronization priority level and returns to step 1320.

Importantly, as the focus copy of the synchronization changes from database copy to database copy, data records already processed are ignored. For example, a modification of a record in one database copy, that has already been the focus copy during the synchronization process, made in all the database copies will supersede a deletion of the same record in another database that later becomes the focus copy.

By way of example, in the coordinated n-way synchronization process, at a particular synchronization priority level, after database copy "DB1" is the focus, next database copy "DB2" is made the focus, and those rules of FIG. 11 that define a non-conflicting rule-set for that particular priority level are repeated for each record of DB2, and for all subsequent database copies located at that same particular synchronization priority level that become the focus copy for synchronization purposes. Again, any record of DB2 is ignored that was previously processed. This increases the processing speed of the synchronization. After database copy "DB2" is the focus, next database copy "DB3" is made the focus, and these rules of FIG. 11 are repeated for each record of DB3. Again, any record of DB3 is ignored that was previously processed. After database DB3 is the focus, next database copy "DB4" is made the focus, and these rules of FIG. 11 are repeated for each record of DB4. Again, any record of DB4 is ignored that was previously processed. This process ends when DB-n is finally processed as the focus. The synchronization result is the same no matter which database copy is selected as the first focus copy.

If all the database copies at that particular synchronization priority level have been a focus copy, then process 1300 proceeds to step 1350. In step 1350, if there are any synchronization priority levels left to process, then process 1300 returns to step 1310 to select a database copy as the synchronization focus copy at the next highest synchronization priority level. Synchronization ends when all the database copies have been synchronized by the coordinated n-way synchronization process 1300.

Also, as discussed previously, with the process outlined in this embodiment of the present invention, only changed data records are considered. This avoids redundancies of checking and rechecking the modification status of each data record with comparison with each database copy. Also, when a new database copy is processed as the focus database copy, any record that was previously processed by another focus database is skipped, thereby preventing a geometric growth in processing time.

While the methods of embodiments illustrated in processes 1000, 1200, and 1300 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

The instructions for the steps, and the data input and output from the steps of processes 1000, 1200, and 1300 may be implemented utilizing processor 201 and ROM memory 203 and RAM memory 202, as shown in FIG. 2. Furthermore, other types of memory storage can be utilized to accomplish the aforementioned such as a hard drive, a CD ROM, flash memory, or any compact integrated circuit memory storage device.

The preferred embodiment of the present invention, a method and system for importing and exporting directory and calendar information to and from personal information management computer applications, is thus described. While the present invention has been described in particular embodiments, it should be appreciated that the present invention should not be construed as limited by such embodiments, but rather construed according to the below claims.

What is claimed is:

1. A method of synchronizing database copies, comprising the steps of:

a) accessing a plurality of copies of a database having a plurality of synchronization priority levels including a first priority level, and a second priority level, said first priority level having a higher synchronization priority than said second priority level;

b) dynamically coordinating a first non-conflicting synchronization rule-set for said first priority level, based on individual rule-sets associated with each of those copies from said plurality of copies assigned to said first priority level that form a first group of rule-sets;

c) dynamically forming a second non-conflicting synchronization rule-set for said second priority level, based on individual rule-sets associated with each of those copies from said plurality of copies assigned to said second priority level that form a second group of rule-sets; and d) synchronizing said plurality of copies according to said plurality of synchronization priority levels and said first and second non-conflicting synchronization rule-sets, beginning with said first priority level and proceeding to a next highest priority level until completion of synchronizing of all copies of said plurality f copies of said database.

2. The method as described in claim 1, wherein said step b) comprises the steps of:

examining all rules from said first group of rule-sets, said rules originating from said individual rule-sets associated with each of those copies from said plurality of copies assigned to said first priority level;

selecting all common rules;

selecting all non-conflicting rules;

selecting rules according to a first meta rule-set resolution principle associated with said first priority level when rules conflict; and dynamically creating said first non-conflicting rule-set.

3. The method as described in claim 2, wherein said first meta rule-set resolution principle is one where data is preserved.

4. The method as described in claim 1, wherein said step c) comprises the steps of:

examining all rules from said second group of rule-sets, said rules originating from said individual rule-sets associated with each of those copies from said plurality of copies assigned to said second priority level;

selecting all common rules;

selecting all non-conflicting rules;

selecting rules according to a second meta rule-set resolution principle associated with said second priority level when rules conflict; and dynamically creating said second non-conflicting rule-set.

5. The method as described in claim 4, wherein said second meta rule-set resolution principle is one where data is preserved.

6. The method as described in claim 1, wherein said step d) comprises the step of implementing said first non-conflicting synchronization rule-set when synchronizing those copies of said plurality of copies of said database classified with said first priority level, and implementing said second non-conflicting synchronization rule-set when synchronizing those copies of said plurality of copies of said database classified with said second priority level.

7. The method as described in claim 1, wherein said step d) comprises the step of synchronizing all copies of said plurality of copies of said database classified at a present priority level before proceeding to the next highest priority level.

8. The method as described in claim 1, wherein when resolving synchronization conflicts between copies of said database, synchronization rules of copies associated with priority levels having a higher synchronization priority override synchronization rules of copies associated with priority levels with a lower synchronization priority.

9. The method as described in claim 1, wherein each of said plurality of copies is located in an electronic device taken from a group consisting essentially of:
 a personal digital assistant;
 a server computer;
 a phone;
 a cell phone; and
 a computer.

10. A method of synchronizing a plurality of copies of a database comprising the steps of:
 a) recognizing a plurality of synchronization priority levels that form a hierarchy from the lowest to the highest synchronization priority level, wherein each of said plurality of copies of said database is classified with one of said plurality of synchronization priority levels, each of said plurality of copies of said database having an individual synchronization rule-set including synchronization rules;
 b) dynamically coordinating a non-conflicting synchronization rule-set for each of said plurality of synchronization priority levels, forming a plurality of non-conflicting rule-sets; and
 c) synchronizing said plurality of copies according to said plurality of synchronization priority levels and said plurality of non-conflicting synchronization rule sets, beginning with the level associated with said highest synchronization priority and proceeding to the next highest priority level until completion of synchronizing of all copies of said plurality of copies of said database.

11. The method as described in claim 10, wherein at each of said plurality of synchronization priority levels including a present synchronization priority level, said step b) comprises the steps of:
 examining all synchronization rules from those individual synchronization rule-sets associated with each of said plurality of copies of said database that are classified with said present synchronization priority level;
 selecting all common synchronization rules;
 selecting all non-conflicting synchronization rules;
 selecting synchronization rules according to a meta rule-set resolution principle associated with said present priority level when rules conflict; and
 dynamically creating said non-conflicting rule set for said present priority level.

12. The method as described in claim 11, wherein said meta rule-set resolution principle for each of said plurality of synchronization priority levels is one where data is preserved.

13. The method as described in claim 10, wherein said step c) comprises the step of implementing said non-conflicting synchronization rule-set for a present synchronization priority level when synchronizing those copies of said plurality of copies of said database classified with said present synchronization priority level.

14. The method as described in claim 10, wherein said step c) comprises the step of synchronizing all copies of said plurality of copies of said database classified at a present priority level before proceeding to the next highest priority level.

15. The method as described in claim 10, wherein when resolving synchronization conflicts between copies of said database, synchronization rules of copies associated with priority levels having a higher synchronization priority override synchronization rules of copies associated with priority levels with a lower synchronization priority.

16. The method as described in claim 10, wherein each of said plurality of copies is located in an electronic device taken from a group consisting essentially of:
 a personal digital assistant;
 a server computer;
 a phone;
 a cell phone; and
 a computer.

17. A computer system comprising a processor, a memory unit, and a display screen, wherein said memory contains instructions that when executed implement a method of synchronizing database copies, comprising the steps of:
 a) accessing a plurality of copies of a database having a plurality of synchronization priority levels including a first priority level, and a second priority level, said first priority level having a higher synchronization priority than said second priority level;
 b) dynamically coordinating a first non-conflicting synchronization rule-set for said first priority level, based on individual rule-sets associated with each of those copies from said plurality of copies assigned to said first priority level that form a first group of rule-sets; c) dynamically forming a second non-conflicting synchronization rule-set for said second priority level, based on individual rule-sets associated with each of those copies from said plurality of copies assigned to said second priority level that form a second group of rule-sets; and
 d) synchronizing said plurality of copies according to said plurality of synchronization priority levels and said first and second non-conflicting synchronization rule-sets, beginning with said first priority level and proceeding to a next highest priority level until completion of synchronizing of all copies of said plurality of copies of said database.

18. The computer system as described in claim 17, wherein said step b) comprises the steps of:
 examining all rules from said first group of rule-sets, said rules originating from said individual rule-sets associated with each of those copies from said plurality of copies assigned to said first priority level;
 selecting all common rules;
 selecting all non-conflicting rules;

selecting rules according to a first meta rule-set resolution principle associated with said first priority level when rules conflict; and dynamically creating said first non-conflicting rule-set.

19. The computer system as described in claim 18, wherein said first meta rule-set resolution principle is one where data is preserved.

20. The computer system as described in claim 17, wherein said step c) comprises the steps of:

examining all rules from said second group of rule-sets, said rules originating from said individual rule-sets associated with each of those copies from said plurality of copies assigned to said second priority level;

selecting all common rules;

selecting all non-conflicting rules;

selecting rules according to a second meta rule-set resolution principle associated with said second priority level when rules conflict; and dynamically creating said second non-conflicting rule-set.

21. The computer system as described in claim 20, wherein said second meta rule-set resolution principle is one where data is preserved.

22. The computer system as described in claim 17, wherein said step d) comprises the step of implementing said first non-conflicting synchronization rule-set when synchronizing those copies of said plurality of copies of said database classified with said first priority level, and implementing said second non-conflicting synchronization rule-set when synchronizing those copies of said plurality of copies of said database classified with said second priority level.

23. The computer system as described in claim 17, wherein said step d) comprises the step of synchronizing all copies of said plurality of copies of said database classified at a present priority level before proceeding to the next highest priority level.

24. The computer system as described in claim 17, wherein when resolving synchronization conflicts between copies of said database, synchronization rules of copies associated with priority levels having a higher synchronization priority override synchronization rules of copies associated with priority levels with a lower synchronization priority.

25. The computer system as described in claim 17, wherein each of said plurality of copies is located in an electronic device taken from a group consisting essentially of:

a personal digital assistant;

a server computer;

a phone;

a cell phone; and a computer.

\* \* \* \* \*